Nov. 10, 1925. 1,560,742
R. J. TRUMBULL
AUTOMOBILE SEAT COVER
Filed Sept. 1, 1923  2 Sheets-Sheet 1
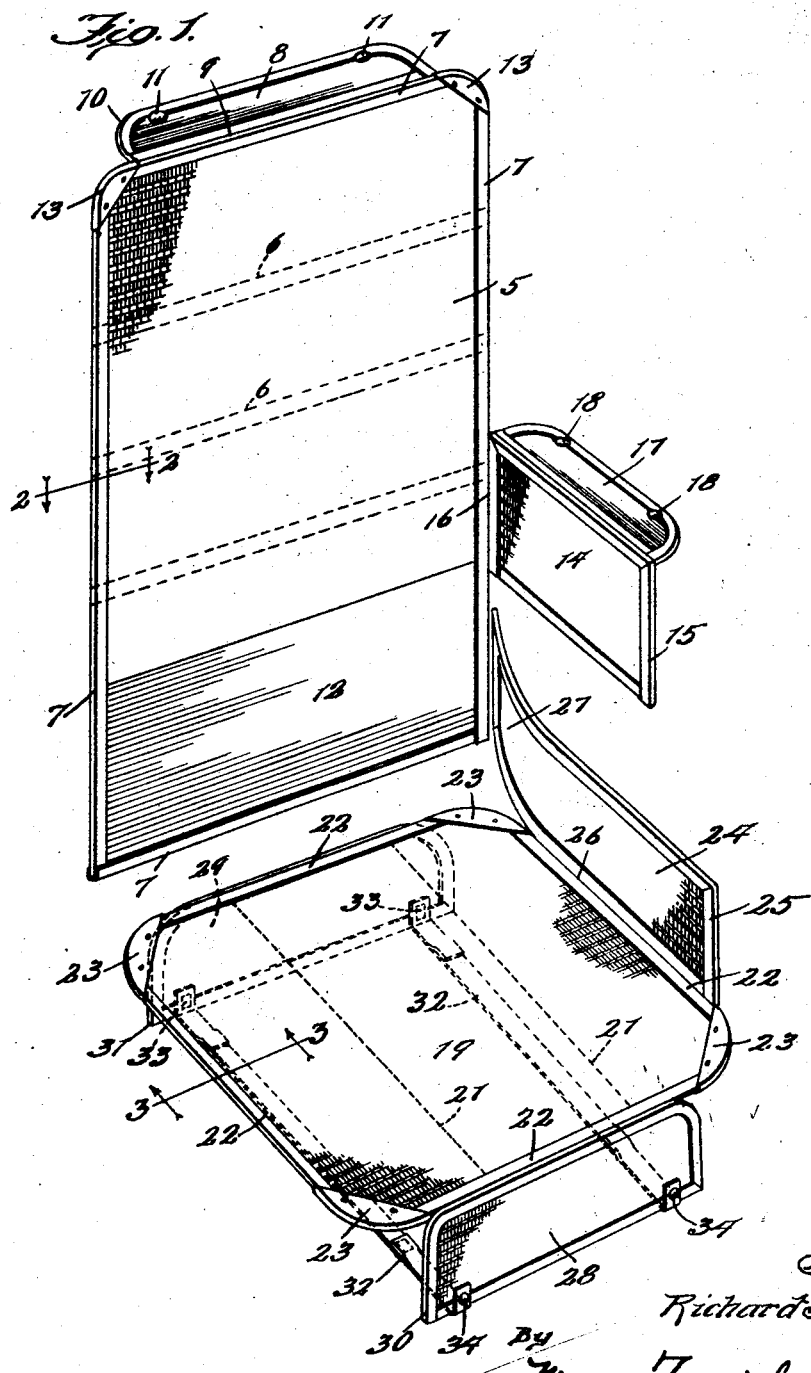

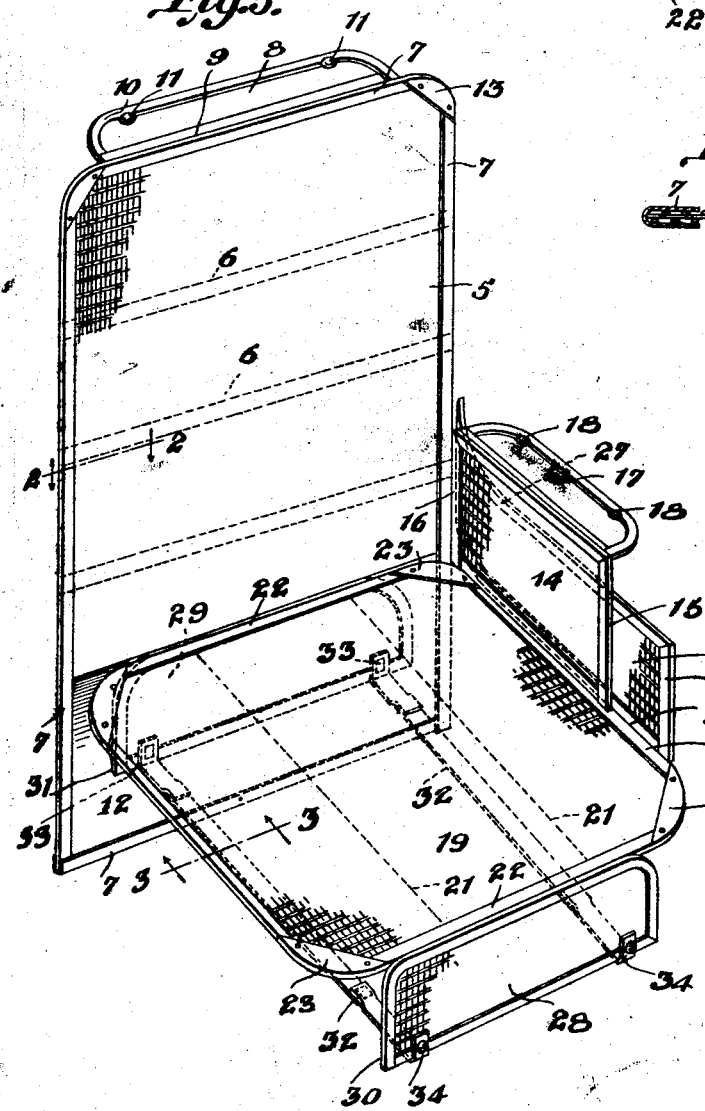

Patented Nov. 10, 1925.

1,560,742

UNITED STATES PATENT OFFICE.

RICHARD J. TRUMBULL, OF CHICAGO, ILLINOIS.

AUTOMOBILE SEAT COVER.

Application filed September 1, 1923. Serial No. 660,511.

*To all whom it may concern:*

Be it known that I, RICHARD J. TRUMBULL, a citizen of the United States, residing at 3019 Indiana Avenue, Chicago, in the county of Cook and State of Illinois, have invented certain new and useful Improvements in Automobile Seat Covers; and I do hereby declare the following to be a full, clear, and exact description of the invention, such as will enable others skilled in the art to which it appertains to make and use the same.

This invention relates to a novel seat cover particularly designed for use in connection with automobile seats.

The principal object of the invention is the provision of a novel cover for automobile seats and the like which can be readily placed in position or removed and which comprises a plurality of parts joined in such a manner as to provide a cover for the seat proper and back, as well as to provide an arm rest or rests and guards at the sides of a seat to protect the clothing of the user from being soiled by the ordinary covering, as well as to provide a clean and comfortable support.

Another object of the invention is to provide a novel seat cover, including means to retain the back thereof in position at the top of the back cushion of the seat and also at the top portions of the sides or arms, to retain the back and seat cover proper in position so that they will not shift but will conform to the contour of the automobile seat, cushions or other form of seat, the back being retained in an upright position and the seat portion being prevented from shifting out of position in such a manner as to interfere with its serving its intended purposes.

A further object of the invention is to provide a novel seat cover of laminated structure, embodying a plurality of layers of material such as matting, so connected and reinforced as to prevent warping thereof as well as stiffened to prevent it from falling out of position.

Other and further important objects of the invention will be apparent from the disclosures in the accompanying drawings and specification.

The invention, in a preferred form, is illustrated in the drawings, and hereinafter more fully described.

Figure 1 is a perspective view showing my novel automobile seat cover, the parts being in disassembled relation.

Figure 2 is a detail sectional view taken on the line 2—2 of Figure 1.

Figure 3 is a detail sectional view taken on the line 3—3 of Figure 1.

Figure 4 is a fragmentary detail showing a form of weave employed in the material of the cover.

Figure 5 illustrates a perspective view of the parts in assembled relation.

Referring to the drawings in detail, in which like reference characters designate corresponding parts throughout the several views, 5 designates the back of the seat cover adapted to be applied or fitted against the back of a seat or chair, such as the back cushion of an automobile seat, and is preferably made of matting or similar waterproof or washable woven material to provide a clean and comfortable support. However, this material may be cloth, leather, fiber, or any other desired material. The back 5 is provided with a plurality of reinforcing strips or stays 6 preferably of waterproof fabricord, leather or like material which will not soil and which is designed to match the material used in the construction of the seat cushions, when used in connection with an automobile seat. These strips may be suitably stiffened or reinforced and are arranged transversely or horizontally in spaced parallel relation and preferably sewed to the matting or other material of the back to prevent the latter from buckling, warping or otherwise getting out of shape or being torn or pulled apart. A binding 7 similar to the material of the strips 6 is sewed or otherwise secured around the edge of the back, including the sides, top and bottom, and an extension or securing flap 8 is sewed or otherwise attached as indicated at 9 to the binding 7 at the top edge of the back 5 and provided with a reinforcing portion or edge binding 10 and fasteners 11, such as glove fasteners or the like, adapted to engage corresponding fastener parts at the top of an automobile seat for securing the back in position and preventing it from dropping down, as usually occurs in devices of this character.

The lower portion or end of the back 5 is designed to extend between the seat and back cushions of an automobile seat and preferably has a covering or facing 12 of waterproof fabricord or like material to protect it from wear. The top corners of the back may be reinforced with aluminum or other metallic corner pieces 13 which are pressed to frictionally hold them in position, although it is to be understood that any other suitable manner of securing the corner pieces in position may be employed. At one or both sides of the back 5, guards 14 are provided. These guards are preferably of matting or the like, provided with a binding 15 and secured to the side edges or binding 7 of the back 5 as indicated at 16 spaced from the bottom edge of the back and preferably terminating near the top edge of the covering or facing 12. The guard 14, as above stated, may be provided at one or both sides of the back, depending upon whether the cover is designed to extend entirely across an automobile seat or made to accommodate one person only, and at its top edge is provided a securing flap or extension 17 corresponding in construction to that of the extension or securing flap 8 and provided with fasteners 18 to engage coacting fastener parts at the top edge of a side or arm of an automobile seat.

The seat cover proper is designated at 19 and preferably consists of a plurality of layers of matting or the like, as more particularly indicated in Figure 3 of the drawings, with the fibers of one layer running transversely to or in a direction different from that of the other layer, and, if desired, provided with a filling or core 20 of buckram, canvas or other suitable stiffening material of cloth, or the like, to which the matting layers may be sewed as indicated at 21 to strengthen the seat and prevent it from getting out of shape or being torn or disintegrated. A binding 22 corresponding to the binding 7 is provided for the seat cover part 19 and metallic reinforcing corners 23 of aluminum or the like may be provided at the corners of the said part and secured in position as explained in connection with the reinforcing corners 13 at the upper edge of the back portion 5.

At one or both sides of the seat part 19 side guards 24 may be provided, these side guards 24 being of matting or the like, and having a binding 25 sewed or otherwise secured to the binding 22 as indicated at 26, and adapted to fit against the sides of an automobile seat and to extend between the side cushions and the back cushions at the rear ends 27 thereof, which are free, as clearly shown in Figure 1 of the drawings. This construction not only protects the clothes of the user at the sides of the seat but also assists in retaining the parts of the device in position. In this connection it may be noted that when the parts are disposed in proper position the side member 24 will be disposed on one side or the other of the guard 14, preferably on the outside thereof. As the seat cushion on which this member 19 is placed is moved up and down due to the yielding of the springs under the occupant's weight, the side panel 24 may slide freely with respect to panel 14, the said panels being aided materially in retaining their relative sliding positions by reason of the preferred form of material used, namely, interwoven strips of fibre, reed or other suitable material.

As a further means of retaining the seat part 19 in position, vertical flaps or extensions 28 and 29 are provided at the front and rear edges of the seat part, and have bindings 30 and 31 sewed or otherwise secured to the binding 22. The extension 28 is disposed vertically against the front edge of the seat cushion of an automobile seat or the like, while the extension 29 is disposed between the seat cushion and the back cushion of an automobile seat and are connected by adjustable and detachable straps 32, preferably of elastic material sewed or otherwise permanently attached to the flap or extension 29 as indicated at 33 and connected to the flap or extension 28 by glove fasteners or the like 34. It will thus be seen that the straps 32 extend between the seat cushion and an automobile seat, or beneath the seat portion of a chair, bench, or the like and retain the part 19 of the cover against shifting as well as to retain the front extension or flap 28 against the front of the seat to additionally protect the clothes of the user.

In Figure 4 of the drawings, an enlarged detail of the material of which the seat and back portions may be formed, is shown consisting of interwoven strips of fiber, reed or other suitable material. The construction of the device as described is of special advantage in connection with an automobile seat having tufted back and seat portions or other seats having cushion action in which the seat part moves up and down responsive to the weight of the body as the vehicle moves over uneven road surfaces, while the back moves forwardly and backwardly or transverse to the direction of the movement of the seat. The parts of the cover being separate, they may move independently and the facing 12 at the lower portion of the back 5 protects the back from wear, due to the relative movement of the seat part 9 with respect thereto while in contact therewith, thus eliminating all undue friction, wear and tear and preventing the parts from being pulled apart as happens where they are connected or sewed.

As previously stated, the cover is made of China or Japan matting, or made of some porous material, buckram or the like, designed to keep the clothing clean. It may be readily cleaned or washed, and will give the necessary stiffness to remain in position on tufted seats, cushions or other form of seats.

Having thus described my invention, what I claim is:—

The combination of a back protective panel for seats the lower portion of the back being adapted to extend below the seat in the rear, a side wing extending forwardly therefrom intermediate the ends thereof, a seat cushion protective panel independent of said back panel having an upstanding side panel secured thereto along a side edge thereof, and movable therewith, said side panel and side wing adapted to be disposed in sliding relation with each other, the side panel being disposed between the side wing and the side of the seat.

In testimony whereof I have affixed my signature.

RICHARD J. TRUMBULL.